July 9, 1929.　　　　　S. R. BELL　　　　　1,720,027
ATTACHMENT FOR WINDSHIELD VISION GLASSES
Filed July 22, 1927
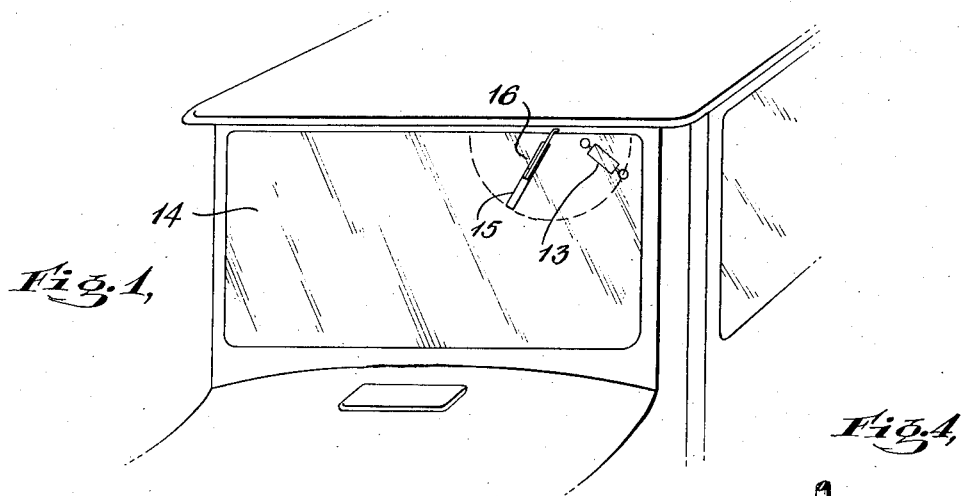
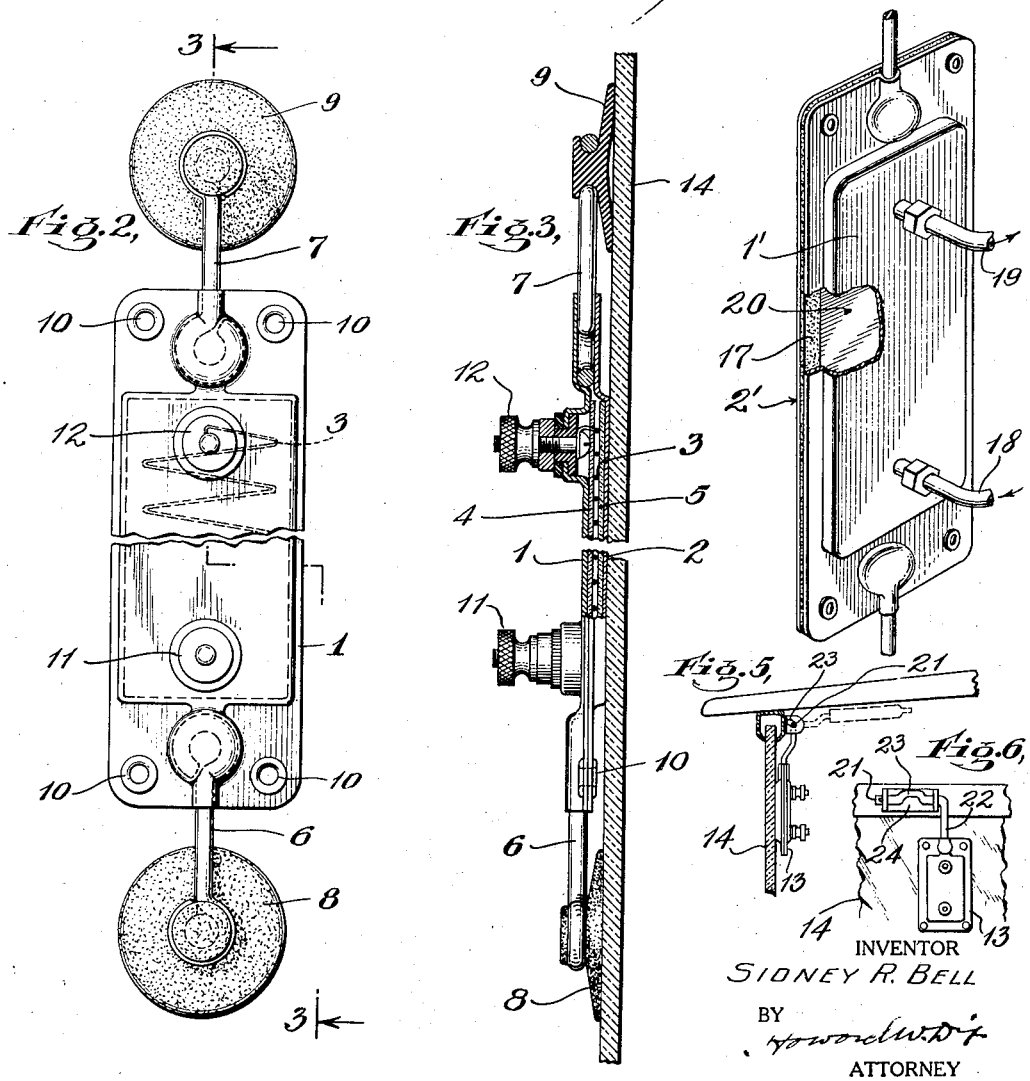
INVENTOR
SIDNEY R. BELL
BY
ATTORNEY Patented July 9, 1929.

1,720,027

UNITED STATES PATENT OFFICE.

SIDNEY R. BELL, OF ROWAYTON, CONNECTICUT.

ATTACHMENT FOR WINDSHIELD VISION GLASSES.

Application filed July 22, 1927. Serial No. 207,592.

This invention relates to an improved device to be detachably secured to a windshield vision glass, for preventing the formation of ice on the glass, thereby enabling the wiper with which windshields are now commonly equipped to function in a proper manner.

A still further object of my invention is the provision of a device of the character indicated which will tend to prevent the formation of mist or vapor on the glass in the line of vision of the driver, due to rise in the temperature within the car or other vehicle equipped with my device.

A still further object of my invention is the provision of a device of the character indicated which is so constructed and arranged that the same may be positioned on the windshield vision glass in any position desired by the user, thereby enabling the same to be properly placed at all times with respect to the line of vision of each individual driver.

A still further object of my invention is the provision of a device of the character indicated, so simple in construction as to enable the same to reach the ultimate consumer at the minimum price, enabling the consumer, should the device be lost, to replace the same at a nominal sum.

Another object of my invention is the provision of a device of the character indicated which can be readily removed when not required, and as easily applied again when needed.

In general my preferred form of device consists of an electrically-heated member adapted to be detachably held to the windshield vision glass preferably by suction cups or equivalent securing means, the current for energizing the heating element being taken from the car battery or other convenient source of supply. The device, as above indicated, may be attached or detached instantly without the use of tools of any kind and may be located with respect to the wiper to suit the individual.

In the accompanying drawings,

Fig. 1 shows in elevation the windshield vision glass of a vehicle with my device in place thereon;

Fig. 2 is a plan view of my improved device;

Fig. 3 is a section thereof taken on the line 3—3 of Fig. 2;

Fig. 4 is a view in perspective illustrating a modification of the apparatus;

Fig. 5 is a view partly in section illustrating a modified supporting structure; and Fig. 6 is a view in elevation of the modification of Fig. 5.

Referring to the drawings in detail, my improved device comprises two flat metal plates designated 1 and 2, respectively, spaced apart slightly to provide for the reception of an interposed heating element 3 and electric insulating strips 4 and 5 either side of the heating element.

The ends of the plates 1 and 2 are preferably bent slightly out of the plane of the outer face of the plate 2, for example and receive supporting members 6 and 7 for attaching suction cups 8 and 9, respectively.

The plates 1 and 2 are preferably constructed so as to be attached to each other by rivets or eyelets 10, which when headed up, clamp the supporting members 6 and 7, the heating element 3 and insulating members 4 and 5 securely to each other so as to provide in effect a unitary structure and I may make this casing waterproof and possibly airtight by some means, such as gasket or a sealing compound as indicated at 17 in Fig. 4.

Binding posts or terminals 11 and 12 are rigidly attached to the device and provide means for connecting the heating element to any convenient source of electric power, such as an automobile battery.

Referring to Fig. 1, the device as a whole has been designated 13, while the windshield vision glass to which it is attached is designated 14. The usual wiper 15 which may be of any of the well known types available is designated 16.

I have illustrated my device as attached to the left side of the windshield facing forward and in close enough proximity to that part of the glass swept by the wiper to heat the same sufficiently to prevent the formation of ice thereon. It is to be understood, however, that this positioning of the device is optional with the individual driver, as will be obvious, and may be mounted on either side of the glass but preferably on the inside. By bending the ends of the device out of the plane of the outer face of the member which it is desired to contact with the glass 14, it will be seen that the cups 8 and 9 may be depressed sufficiently to enable them to cling to the glass 14, at the same time bringing the face of the plate 2 in contact with the glass, to most efficiently apply the heat of the heating element 3 thereto.

In lieu of obtaining heat from an electric element, I may use different heating mediums such as hot air generated by the engine or hot water drawn from the engine water circulating system. One of such forms is shown in Fig. 4, wherein the plates 1' and 2' are similar respectively to plates 1 and 2 of the form shown in Figs. 2 and 3. In place of binding posts 11 and 12, I provide an inlet pipe 18 for either hot air or hot water and an outlet pipe 19 thus providing free circulation for the heating medium into and out of the chamber 20 formed by the plates 1' and 2', the gasket 17 providing a seal between said plates.

In Figs. 5 and 6 I have shown a different form of attachment wherein the device 13 may be held in either of two positions; in contact with the glass 14 or as shown by dotted lines in Fig. 5, swung up about the pivot 21 to an inoperative position. Preferably for holding the unit 13 in either position, I offset the pivot rod 21, which is a continuation of the supporting rod 22 for the unit 13, thus providing resilient pressure means as at 23. The pivot rod 21 is mounted for a swinging movement in bracket 24 which is in turn fastened to the metal frame of the windshield.

While I have described the invention in full, it is to be understood that changes may be made in the details thereof within the purview of the invention.

From all of the foregoing, it will be apparent that I have provided a device for attachment to the vision glass of a windshield which will prevent the formation of ice thereon, thereby enabling the wiper to work properly at all times, and that the device when not needed may be quickly removed from the glass without necessitating the use of tools or other accessories, thus it is stored away until needed again, when it may be applied in a moment and without the requirement of any special skill on the part of the user.

It will be understood that while I have herein described in detail a particular embodiment of my invention for purposes of full disclosures, and some detailed features which I am specifically claiming for a special advantage, many changes and modifications may be made in the particular construction and arrangement of parts without departing from the broad scope of my invention which is outlined in the sub-joined claims.

What I claim is:

1. In combination, a pair of superimposed plates, an interposed heating element, the ends of said plates being bent out of the plane of one of said plates, suction cups, supports therefor positioned between said plates, and means clamping said plates upon the cup supports to hold the cups in position whereby the structure may be detachably held to a vision glass with one of said plates in contact therewith.

2. In a heater, the combination of a pair of substantially flat plates having the ends thereof bent upward and outward and the outer plate having overlapping edges to engage the second plate, an electrical resistance element positioned within said plates, insulating means surrounding said resistance element and firmly held between said plates, electrical terminal elements passing through said outer plate, said second plate adapted to lie flat on a surface, supporting means received in the outermost ends of said plates, and mounting means held by said supports and adapted to engage the flat surface against which said second plate is positioned for holding said heater in association with said flat surface, said plates being pinched tightly together to prevent moisture from reaching said electrical resistance element.

3. In a heater for windshield vision glasses, the combination of two superimposed metal plates having their edges interlocked to hold the two plates to each other, an electrical resistance element intermediate the two plates and enclosed thereby, electrical insulating material at each side of said resistance element for maintaining the resistance element out of contact with said plates, and vacuum cups carried by the outer ends of the plates and adapted to hold the device in place on a vision glass with one of said plates which is heat conductive in contact with the glass to heat the same by conduction.

4. A heater for vision glasses comprising a casing, one side of the casing comprising a flat elongated plate of heat conductive material covering the entire area bounded by the peripheral edges of the casing, an electric resistance element supported in the casing and insulated therefrom, said element being arranged to cover substantially the entire area of said plate and being in direct contactual engagement therewith, and means for yieldably supporting said heater in position to arrange said plate in abutting relation with reference to a predetermined surface of the vision glass to transmit the heat of said element to the glass directly through said plate.

5. A heater for vision glasses comprising a casing, one side of the casing comprising a flat elongated plate of heat conductive material covering the entire area bounded by the peripheral edges of the casing, an electric resistance element supported in the casing and insulated therefrom, said element being arranged to cover substantially the entire area of said plate and being in direct contactual engagement therewith, means for yieldably supporting said heater in position to arrange said plate in abutting relation with reference to a predetermined surface of the vision glass to transmit the heat of said element to the glass directly through said plate, and said casing including end extensions offset with respect to said plate and providing means of attachment for said supporting means.

6. A heater for vision glasses comprising a casing, one side of the casing comprising a flat elongated plate of heat conductive material covering the entire area bounded by the peripheral edges of the casing, an electric resistance element supported in the casing and insulated therefrom, said element being arranged to cover substantially the entire area of said plate and being in direct contactual engagement therewith, means for yieldably supporting said heater in position to arrange said plate in abutting relation with reference to a predetermined surface of the vision glass to transmit the heat of said element to the glass directly through said plate, and said casing including another and outer plate interlocked with the first named plate in forming said casing and in retaining said element therein, and extensions at the ends of said casing projecting beyond said element and offset with respect to the first named plate.

This specification signed this 18th day of July, 1927.

SIDNEY R. BELL.